(12) United States Patent
Chawda

(10) Patent No.: US 10,782,934 B1
(45) Date of Patent: Sep. 22, 2020

(54) MIGRATING COMPUTER PROGRAMS TO VIRTUAL COMPUTE SERVICES USING ANNOTATIONS

(71) Applicant: Amazon Technologies, Inc., Seattle, WA (US)

(72) Inventor: Vivek Chawda, Albany, CA (US)

(73) Assignee: Amazon Technologies, Inc., Seattle, Wake Island ( * ) Notice: Subject to any disclaimer, the term of this patent is extended or adjusted under 35 U.S.C. 154(b) by 0 days.

(21) Appl. No.: 15/861,365

(22) Filed: Jan. 3, 2018

(51) Int. Cl.
| | | |
|---|---|---|
| *G06F 8/30* | (2018.01) | |
| *G06F 8/75* | (2018.01) | |
| *G06F 8/73* | (2018.01) | |
| *G06F 8/71* | (2018.01) | |
| *G06F 9/54* | (2006.01) | |

(Continued)

(52) U.S. Cl.
CPC .................. *G06F 8/30* (2013.01); *G06F 8/65* (2013.01); *G06F 8/71* (2013.01); *G06F 8/73* (2013.01); *G06F 8/75* (2013.01); *G06F 9/455* (2013.01); *G06F 9/547* (2013.01); *G06F 11/301* (2013.01);

(Continued)

(58) Field of Classification Search
CPC .. G06F 17/2785; G06F 17/30958; G06F 8/41; G06F 8/73; G06F 17/30525; G06F 8/40; G06F 8/72; G06F 11/3604; G06F 17/30327; G06F 8/30; G06F 8/65; G06F 8/71; G06F 8/75; G06F 9/455; G06F 9/547; G06F 11/301; G06F 11/302; G06F 11/3495; H04L 67/10

See application file for complete search history.

(56) References Cited

U.S. PATENT DOCUMENTS

| | | | | |
|---|---|---|---|---|
| 7,707,564 | B2 * | 4/2010 | Marvin | G06F 8/31 717/106 |
| 9,009,682 | B2 * | 4/2015 | Tsantilis | G06F 11/3688 717/124 |

(Continued)

OTHER PUBLICATIONS

K. Kontogiannis; Code Migration Through Transformations an Experience Report; CASCON; pp. 201-213; retrieved on Apr. 28, 2020 (Year: 2010).*

(Continued)

*Primary Examiner* — S. Sough
*Assistant Examiner* — Cuong V Luu
(74) *Attorney, Agent, or Firm* — Nicholson De Vos Webster & Elliott LLP

(57) ABSTRACT

Techniques for migrating source code to a virtual compute service are described. The migration of source code is assisted by metadata that identifies portions of the source code—for example, one or more classes, methods, functions, subroutines, and so forth—desired to be replicated by one or more virtual compute service functions executing in the virtual compute service. One or more virtual compute service functions are created at the virtual compute service that implement the functionality of the identified portions of source code. The identified source code can be refactored to invoke the corresponding virtual compute service function(s) in the virtual compute service using, for example, application programming interface (API) calls sent over a network to the service provider system. In this manner, the external functional behavior of the source code can remain the same while internally taking advantage of the benefits offered by a virtual compute service.

16 Claims, 9 Drawing Sheets

(51) Int. Cl.
*G06F 8/65* (2018.01)
*G06F 11/30* (2006.01)
*G06F 11/34* (2006.01)
*G06F 9/455* (2018.01)
*H04L 29/08* (2006.01)

(52) U.S. Cl.
CPC ........ *G06F 11/302* (2013.01); *G06F 11/3495* (2013.01); *H04L 67/10* (2013.01)

(56) References Cited

U.S. PATENT DOCUMENTS

| | | | | |
|---|---|---|---|---|
| 9,021,451 | B2* | 4/2015 | Park | G06F 11/3636 |
| | | | | 717/132 |
| 9,213,532 | B2* | 12/2015 | Guthridge | G06F 8/4441 |
| 9,450,838 | B2* | 9/2016 | Jain | G06F 9/5072 |
| 9,703,534 | B2* | 7/2017 | Ben-Tzur | G06F 17/30867 |
| 9,894,185 | B2* | 2/2018 | De Angelis | H04L 67/10 |
| 2005/0021689 | A1* | 1/2005 | Marvin | G06F 8/31 |
| | | | | 709/220 |
| 2012/0151455 | A1* | 6/2012 | Tsantilis | G06F 11/3688 |
| | | | | 717/132 |
| 2012/0331113 | A1* | 12/2012 | Jain | G06F 9/5072 |
| | | | | 709/220 |
| 2014/0040869 | A1* | 2/2014 | Park | G06F 11/3612 |
| | | | | 717/133 |
| 2014/0047015 | A1* | 2/2014 | Sheshagiri | G06F 8/51 |
| | | | | 709/203 |
| 2015/0089483 | A1* | 3/2015 | Guthridge | G06F 8/4441 |
| | | | | 717/140 |
| 2016/0173648 | A1* | 6/2016 | De Angelis | H04L 67/10 |
| | | | | 709/203 |
| 2017/0039064 | A1* | 2/2017 | Arthurs | G06F 8/73 |
| 2017/0286103 | A1* | 10/2017 | Caritos, II | G06F 8/73 |
| 2017/0315788 | A1* | 11/2017 | Ben-Tzur | G06F 17/30867 |

OTHER PUBLICATIONS

Tien N. Nguyen; Code Migration with Statistical Machine Translation; ACM; 1 page; retrieved on Apr. 28, 2020 (Year: 2016).*

* cited by examiner

MIGRATING COMPUTER PROGRAMS TO VIRTUAL COMPUTE SERVICES USING ANNOTATIONS

BACKGROUND

As an increasing number of applications and services are being made available over networks such as the internet, an increasing number of content, application, and service providers are turning to technologies such as cloud computing. Cloud computing, in general, is an approach to providing access to electronic resources through services, such as web services, where the hardware and software used to provide those services is dynamically scalable to meet the needs of users of the services at any given time. A user (or "customer") typically rents, leases, or otherwise pays for access to resources provided by a service provider's system and thus can avoid purchasing and maintaining the underlying hardware and software at a customer's site.

In this context, many cloud computing service providers use virtualization and multi-tenant architectures to allow multiple users to share the service provider's underlying hardware and software resources. Virtualization allows servers, storage devices, and other hardware resources to be partitioned into multiple isolated instances that can be assigned to and used by many different users. Multiple users can concurrently use a cloud computing provider's resources thereby increasing the number of users a service provider can support and reducing the management and financial costs to both the service provider and its customers.

BRIEF DESCRIPTION OF DRAWINGS

Various embodiments in accordance with the present disclosure will be described with reference to the drawings, in which.

DETAILED DESCRIPTION

Figure 1:
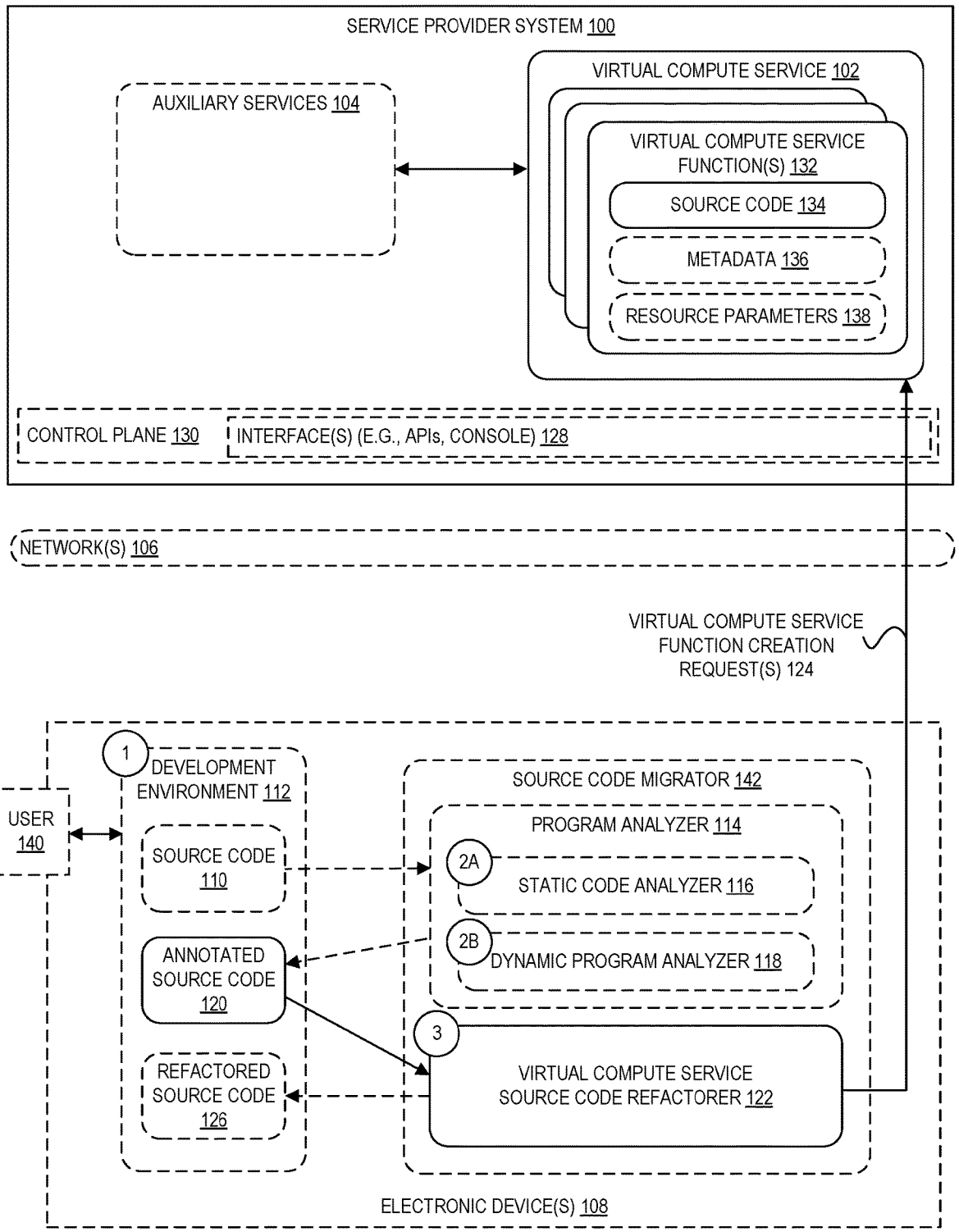
FIG. 1 is a diagram illustrating an environment including components used to migrate computer program source code to a virtual compute service of a service provider system according to some embodiments.

Various embodiments of methods, apparatuses, systems, and non-transitory computer-readable media enable the migration of computer program source code developed for execution in a server-based environment to a "serverless" execution environment provided by a computing resource service provider (commonly referred to as a "cloud computing" service provider). In some embodiments, a serverless execution environment is provided by a service provider system as a virtual compute service which enables users to provide source code to the service for execution without the users needing to provision or manage the computing resources—servers, memory, operating systems, runtime environments, and so forth—used to execute the source code. Source code provided to a virtual compute service can be caused to execute, or be "invoked," in a number of ways including, for example, using a console interface to request execution, in response to an event message generated by another application or service of the service provider system, or in response to an application programming interface (API) request from an application internal or external to the service provider system.

In some embodiments, the migration of source code to a virtual compute service is assisted by the use of metadata that identifies portions of the source code—for example, one or more classes, methods, functions, subroutines, and so forth—desired to be replicated by one or more virtual compute service functions executing in the virtual compute service. For example, this metadata may be used by a source code editor plug-in, compiler plug-in, build and deploy tool, or other process to create one or more virtual compute service functions at the virtual compute service that perform operations equivalent to those performed by the identified portions of source code. In some examples, source code can be entirely migrated to a virtual compute service and executed by the service. In other examples, a user's local source code can be modified, or "refactored," to cause invocation of corresponding virtual compute service function(s) in the virtual compute service at the appropriate times during execution of the source code. By migrating and optionally modifying source code in this manner, the external functional behavior of the source code can remain the same while internally taking advantage of the benefits offered by a virtual compute service.

In some embodiments, metadata used to assist with the migration of source code to a virtual compute service can include "annotations," a form of syntactic metadata that can be included directly in source code as text. For example, annotations can be used directly in the source code to identify particular classes, methods, subroutines, and so forth, desired for migration to a virtual compute service. According to various embodiments described herein, such annotations or other metadata can be associated with source code in a number of ways including manual creation of the metadata by a programmer, based on a static analysis of the source code (for example, to automatically identify constituent parts of the source code that may be suitable for migration), based on a dynamic analysis of the source code's execution (for example, to identify resource usage information related to the constituent parts of the source code to help select candidate code portions for migrations), and various combinations thereof.

In this manner, computer programmers can make use of virtual compute services on the vast body of existing and future program code originally designed to execute in a server-based environment without the need to recreate the source code at the virtual compute service from scratch. Furthermore, the performance of programs derived from source code refactored in this manner can be improved by enabling the programs to take advantage of the availability, scaling, and other performance benefits of a virtual compute service.

As indicated above, in recent years, organizations have begun to realize the benefits of moving their computing resources—for example, servers, data storage, networks, and applications—out of their existing on-premises data centers and into systems managed by third-party service providers. These service provider systems typically provide a wide variety of configurable computing resources that can be provisioned and accessed over the internet, often using a "pay-as-you-go" or similar payment model. The ability to readily obtain such computing resources from these service providers eases many of the burdens organizations face in managing on-premises data centers which tend to be expensive to maintain and frequently encounter scalability and resiliency issues.

A common type of computing resource offered by these types of service providers is compute capacity, which is typically purchased by customers in the form of virtual computing resources, or virtual machine (VM) instances. These VM instances, which are hosted by a service provider on physical computing devices with their own operating systems and other software components, can be used in much the same manner as physical computers. As one example use of such compute capacity, computer programmers can use VM instances provisioned at a service provider system to host developed software applications, such as web or mobile applications.

Today, the development of computer software still largely occurs in the context of server-based execution environments such as that described above. For example, if a software developer creates a software application using a particular programming language, the developer writes the source code and typically may be responsible for building and deploying the code for execution on one or more particular servers (for example, either local servers or servers that the user obtains and configures at a service provider system). As the size and complexity of a software application grows, the developer or other IT support may be responsible for provisioning, managing, and scaling an increasing number of servers used to support the program's execution.

Even when VM instances from a service provider are used to ease some of the server management burdens, developers typically must still decide how many and what type of VM instances to purchase, and how long to keep the VM instances in operation. For example, the costs of using the VM instances provided by service providers may vary depending on the type of instances and number of hours the instances are used. Developers or other IT support typically must also specify the hardware and software resources (for example, type of operating systems and language runtimes, and so forth) to install on the VMs. Other concerns may include over-utilization (that is, acquiring insufficient computing resources resulting in performance issues), under-utilization (that is, acquiring more computing resources than necessary and thus overpaying), and resource scaling as performance demands change over time.

To simplify some aspects of the software development process, some service providers today provide so-called "serverless" code execution environments offered as virtual compute services. In the present disclosure, a virtual compute service refers generally to a service which is able to automatically provision and manage computing resources used to execute program code on behalf of a user, thereby enabling software developers to build and execute software applications without needing to be aware of the computing resources used to execute the underlying source code. Using a virtual compute service, for example, software developers can focus on the operation of code instead of provisioning and managing computing resources used to run the code.

Although virtual compute services are available to software developers today, most existing source code is written with a server-based execution environment in mind. Thus, if a software developer desires to make use of a virtual compute service to execute some or all of such existing source code, the developer currently may recreate portions of the source code from scratch at the virtual compute service, or manually move portions of the existing source code to the virtual compute service and reconfigure other portions of the source code to refer to the virtual compute service. Either of these processes can be error-prone and require a significant amount of manual work.

To improve the process of migrating source code to a serverless execution environment offered by a virtual compute service, embodiments described herein provide ways to associate metadata with source code which can be used to automate many of the processes involved in migrating the source code to a virtual compute service. For example, based on metadata associated with source code, an automated migration process can perform operations including creating functions at the virtual compute service which serve as alternative implementations of the identified source code, and optionally modifying, or "refactoring," the source code to invoke the created virtual compute service functions at the appropriate times during the source code's execution. Embodiments described herein also include techniques for statically analyzing source code and dynamically analyzing corresponding computer program runtimes to assist with the creation of metadata to be associated with source code.

For example, consider again a software developer who has created source code designed initially to execute in a server-based execution environment. Typically, the developer may create the code, set up an environment in which the code will execute (for example, one or more servers, operating systems, runtime environments, and so forth), and use various tools to build and deploy a computer program derived from the source code to the environment. According to embodiments described herein, if a developer of the source code later desires to migrate the source code to a virtual compute service, the developer can associate metadata with the source code (for example, by causing a process to automatically analyze the source code and associate metadata, or by manually inserting annotations in the source code conforming to a defined serverless annotation syntax) used to identify portions of the source code to be replicated as functions for execution by a virtual compute service. In some embodiments, a plug-in to a source code editor, build and deploy tool, or another standalone process, can analyze the metadata and create functions at the virtual compute service that serve as alternative implementations of the identified source code and, optionally, modify the source code to invoke the virtual compute service functions at the appropriate points during the source code's execution.

FIG. 1 is a block diagram illustrating an environment including components used to migrate computer program source code to a virtual compute service of a service provider system according to some embodiments. In an embodiment, a virtual compute service 102 operates as part of a service provider system 100 and comprises one or more software modules executed by one or more electronic devices at one or more data centers and geographic locations. A user 140 using one or more electronic device(s) 108

(which may be part of or separate from the service provider system 100) can interact with the virtual compute service 102 via one or more networks 106, such as the internet. In an embodiment, a source code migrator 142, including an optional program analyzer 114 and a virtual compute service source code refactorer 122, performs operations to automate the migration of source code 110 to a virtual compute service 102 of a service provider system 100.

As described below in reference to FIG. 2, although the environment illustrated in FIG. 1 illustrates a source code migrator 142 co-located with a user's development environment 112, in other embodiments, the migration process can be orchestrated by a source code migrator service located at the service provider system 100 or elsewhere. Furthermore, in some embodiments, some or all of a user's development environment 112 (for example, an IDE, build and deploy tools, and so forth) can be provided as one or more services offered by a service provider system 100.

A service provider system 100 provides users with the ability to use a variety of types of computing resources such as compute capacity (for example, executing VM instances, containers, batch jobs, code without provisioning servers), data storage resources (for example, object storage, block-level storage, data archival storage), network-related resources (for example, configuring virtual networks including groups of computing resources, content delivery networks (CDNs), Domain Name Services (DNS)), application resources (for example, databases, application build and deployment services), and so forth. These and other computing resources may be provided by a virtual compute service 102 and by auxiliary services 104, such as a hardware virtualization service that can execute compute instances, a storage virtualization service that can store data objects, and so forth. The customers of the service provider system 100 may use user accounts associated with a customer account, though these terms may be used somewhat interchangeably depending on context of use. Users may interact with a service provider system 100 across one or more networks 106 (for example, the internet) via one or more interfaces 128, which may include the use of application programming interface (API) calls, via a management console implemented via a website, or a standalone application. These interfaces 128 may be part of, or serve as a front-end to, a control plane 130 of the service provider system 100 that includes "backend" services supporting and enabling various services (for example, including the virtual compute service 102 and auxiliary services 104).

To provide these and other computing resource services, service provider systems 100 often rely upon virtualization techniques. For example, virtualization technologies can be used to provide users the ability to control and use compute instances (for example, a VM using a guest operating system that operates using a hypervisor that may or may not operate in a VM, an instance that can execute on "bare metal" hardware without an underlying hypervisor, and so forth), where one or more multiple compute instances can be implemented using a single electronic device. Thus, a user may directly utilize a compute instance hosted by the service provider system to perform a variety of computing tasks, or may indirectly utilize a compute instance by submitting code to be executed by the service provider system (for example, using the virtual compute service 102), which in turn utilizes a compute instance to execute the code (typically without the user having any control of or knowledge of the underlying compute instance(s) involved).

As indicated above, it has become desirable for some customers to migrate source code, including source code initially written to execute in a server-based environment, to so-called serverless execution environments (for example, as provided by a virtual compute service 102 of a service provider system 100). These customers may desire to migrate source code for any of a number of benefits including increased scalability and stability provided by a virtual compute service 102, reduced management and infrastructure costs, and so forth.

In an embodiment, a virtual compute service 102 hosts source code to be executed without the need for developers of the code to separately provision or manage the computing resources used to execute the source code. A unit of source code configured to run within a virtual compute service 102 is referred to herein as a virtual compute service function (for example, virtual compute service function(s) 132). A virtual compute service function 132 includes source code 134 defining the logic to execute when the function is invoked and, optionally, other metadata 136 and resource parameters 138. Metadata 136 may include, for example, descriptive information related to a corresponding function, including a name of the function (for example, to be used by outside applications requesting invocation of the function), a description of the function's operation, and so forth. Resource parameters 138 may include other information related to the execution of the associated source code 134 such as, for example, an identifier of a runtime environment (for example, "java8," "nodejs," "python3.6," or any other supported runtime environment), an amount of memory to allocate to the function, user roles or permissions to assign to the function, a function execution timeout, and so forth.

In some embodiments, a virtual compute service function 132 is configured to execute in response to events (for example, events generated by one or more auxiliary services 104 or by an application external to the service provider system 100) and the computing resources (compute capacity, memory, storage, and so forth) are managed by the service provider system 100. A virtual compute service function 132 may perform virtually any types of processing actions depending on the particular source code created for the function. For example, virtual compute service functions 132 may be designed to retrieve and transform data (for example, data stored in a storage virtualization service or elsewhere), to audit and report on API calls made to another auxiliary service 104, or used to perform any other processing tasks. A virtual compute service 102 may provide interfaces 128 (for example, web-based interfaces) that enable users or other processes to upload and configure source code 134 to be executed by the virtual compute service, to configure other metadata 136 and resource parameters 138, to associate virtual compute service functions with events, and so forth.

In an embodiment, a virtual compute service 102 can communicate with other components, for example, with electronic device(s) 108 internal or external to the service provider system 100 and with other auxiliary services 104 (which may include, for example, a storage service, a logging service, a hardware virtualization service, and so forth). In some embodiments, the electronic device(s) 108 and one or more of the auxiliary services 104 may be configured to generate event messages for processing by the virtual compute service 102. Thus, for example, an application running on an electronic device 108 or a storage service of the service provider system 100 may be able to trigger the execution of virtual compute service functions by the virtual compute service 102 in response to events as they occur at the electronic device or service (for example, in response to a message generated by an application on device 108, or in response to file being added to a storage location of the storage service).

In one embodiment, the auxiliary services 104 may be registered or configured to be polled or queried for events to trigger the execution of functions at the virtual compute service 102. Such registration or configuration may be provided or enabled via the one or more interfaces 128 provided to the user electronic device(s) 108. For example, a user interface 128 may provide options for the user to select or specify an auxiliary service 104 as a triggering service such that events occurring at the triggering service may trigger generation of event messages, or such that the event triggering service may be periodically polled or queried for events such as by an intermediary polling system. In other embodiments, an auxiliary service 104 can be configured as a triggering service programmatically, for example, in response to an API call from an external application to the virtual compute service 102.

In one embodiment, an event triggering service may be configured to associate an event or event type with one or more particular virtual compute service functions 132 to be executed by the virtual compute service 102 (that is, the event triggering service may store or have access to data which associates the event with the particular virtual compute function 132). In another embodiment, the triggering service may not necessarily associate an event or event type with a particular virtual compute function 132 to be executed by the virtual compute service but rather the event triggering service may generate event messages which the virtual compute service is configured to interpret as being associated with the virtual compute function to be executed by the virtual compute service 102 (that is, the virtual compute service 102 may store or have access to data which associates the event with the particular virtual compute function). In another embodiment, an intermediary system or service may be configured to handle interpretation and routing of event messages to execute the virtual compute functions 132, such that neither the event triggering service nor the virtual compute service 102 may store or have access to the event-to-virtual compute function association data. For example, an event triggering service or external application may generate an event message that is agnostic to any particular virtual compute service function 132 to be executed and the event message may be routed to the virtual compute service 102 (or an intermediary system) which evaluates the event message and associated metadata to determine which virtual compute function 132 to execute in response and initiate a corresponding request to execute the virtual compute function 132.

As indicated above, any of the auxiliary services 104 may be configured to operate as an event triggering service. These include but are not limited to: storage virtualization services, database services, message queue systems (for example, a message queue service provided by the virtual compute service, a message queue service provided by the service provider system, and so forth), logging services, compute resource management services, and so forth.

In an embodiment, users can use the virtual compute service 102 to execute source code. For example, a user may desire to run source code in the connection with a web application, mobile application, or any other type of application that the user has developed. One way of running the source code is to acquire VM instances from a hardware virtualization service of a service provider system 100, configure the VM instances to suit the user's needs, and use the configured VM instances to run the source code. Alternatively, the user may send a source code execution request to the virtual compute service 102. The virtual compute service 102 can handle the acquisition and configuration of compute capacity (for example, containers, VM instances, and so forth) based on the code execution request, and execute the source code using the acquired compute capacity. The virtual compute service 102 may automatically scale up and down based on the volume thereby relieving the user from the burden of having to worry about over-utilization or under-utilization of the associated computing resources. In various embodiments, a virtual compute service 102 supports the execution of source code written in one or more general-purpose programming languages (for example, Java, Python, C#, and so forth) and may optionally support other domain-specific programming languages (possibly including, for example, a programming language specific to the virtual compute service 102).

In an embodiment, a virtual compute service 102 includes an interface 128 that receives and processes requests (sometimes in the form of event messages) to execute source code at the virtual compute service 102. In one embodiment, the interface 128 acts as an interface to auxiliary services 104 and to other requests to execute source code (for example, based on requests to execute virtual compute service functions 132 sent from an application executing internally or externally to the service provider system 100).

In an embodiment, a virtual compute service function 132 comprises source code and associated dependencies and configuration data used by the virtual compute service 102 to execute the source code in response to a request to invoke the function. As indicated above, the configuration data can include information indicating parameters related to desired amounts of computing resources to be made available to the serverless function during execution (for example, an amount of memory, an amount of CPU power, or both), a maximum execution time (for example, a number of minutes in which execution of the serverless function is to execute), security permissions, a handler method (a method in the serverless function source code where execution of the function is to begin), among other possible configurations.

According to embodiments described herein, the migration of source code to a virtual compute service 102, as described above, begins with source code developed or otherwise managed by a user. For example, at the circle labeled "1," FIG. 1 shows source code 110 which may have been developed by a user 140 using a development environment 112. The development environment 112, for example, may comprise a source code editor, an integrated development environment (IDE), or any other application used to create source code. As indicated above, in typical software development environments, the user may use a development environment 112 to develop source code and use a build and deploy tool to create an executable program to be executed by one or more electronic devices provisioned and managed by the customer either locally or in the service provider system 100. As illustrated below in FIG. 2, in some embodiments, a development environment 112 can include one or more components (an IDE, build and deploy tools, and so forth) that are provided as services offered by a service provider system 100.

In the present disclosure, source code 110 may refer to any type of computer program source code (for example, source code representing a program, routine, subroutine, thread, and so forth) written in a programming language. The source code 110 may be executed to perform one or more specific actions, for example, in connection with the performance of an application developed by the user 140.

For example, the source code 110 may be written in Java, JavaScript, Python, C#, Ruby, or any other programming language. For some programming languages, a compiler is typically used to derive machine code from the source code—a form consisting of instructions that a computing device can directly execute. The machine code can also be stored for execution at a later time (for example, as an executable file). Alternatively, some types of source code 110 can be executed directly based on the source code with the aid of an interpreter application and without compiling the source code into a separate executable program. In some embodiments, source code 110 or portions thereof can be executed by a virtual compute service 102. Thus, references herein to execution of source code can refer to any of execution of an executable program derived from the source code, execution of the source code directly, or other execution strategies depending on a particular programming language, build and deploy environment, execution environment used, and so forth.

According to embodiments described herein, to migrate source code 110 to a virtual compute service 102, metadata can be associated with the source code, where the metadata is used to identify portions of the source code representing functionality to be performed by a computing device upon execution of the source code, and for which it is desired that the functionality be replicated by one or more virtual compute service functions 132 of a virtual compute service 102. As indicated above, such metadata can be associated with the source code in a number of ways including, for example, manual association of the metadata by a developer of the source code or by an automated analysis of the source code, as described in more detail below.

In FIG. 1, at circles "2A" and "2B," the source code 110 optionally can be analyzed by components of a program analyzer 114 to automatically associate metadata with source code 110. For example, at circle "2A," the source code 110 may be analyzed by a static code analyzer 116 to identify portions of the source code that may be suitable for migration to a virtual compute service. At circle "2B," a dynamic program analyzer 118 can be used, possibly in combination with the static code analyzer 116, to analyze an executing computer program derived from the source code 110 and to identify candidate portions of the source code for migration by a source code migrator 142. The analysis of source code 110 by a static code analyzer 116, dynamic program analyzer 118, or both, may result in the generation of annotated source code 120.

Figure 2:
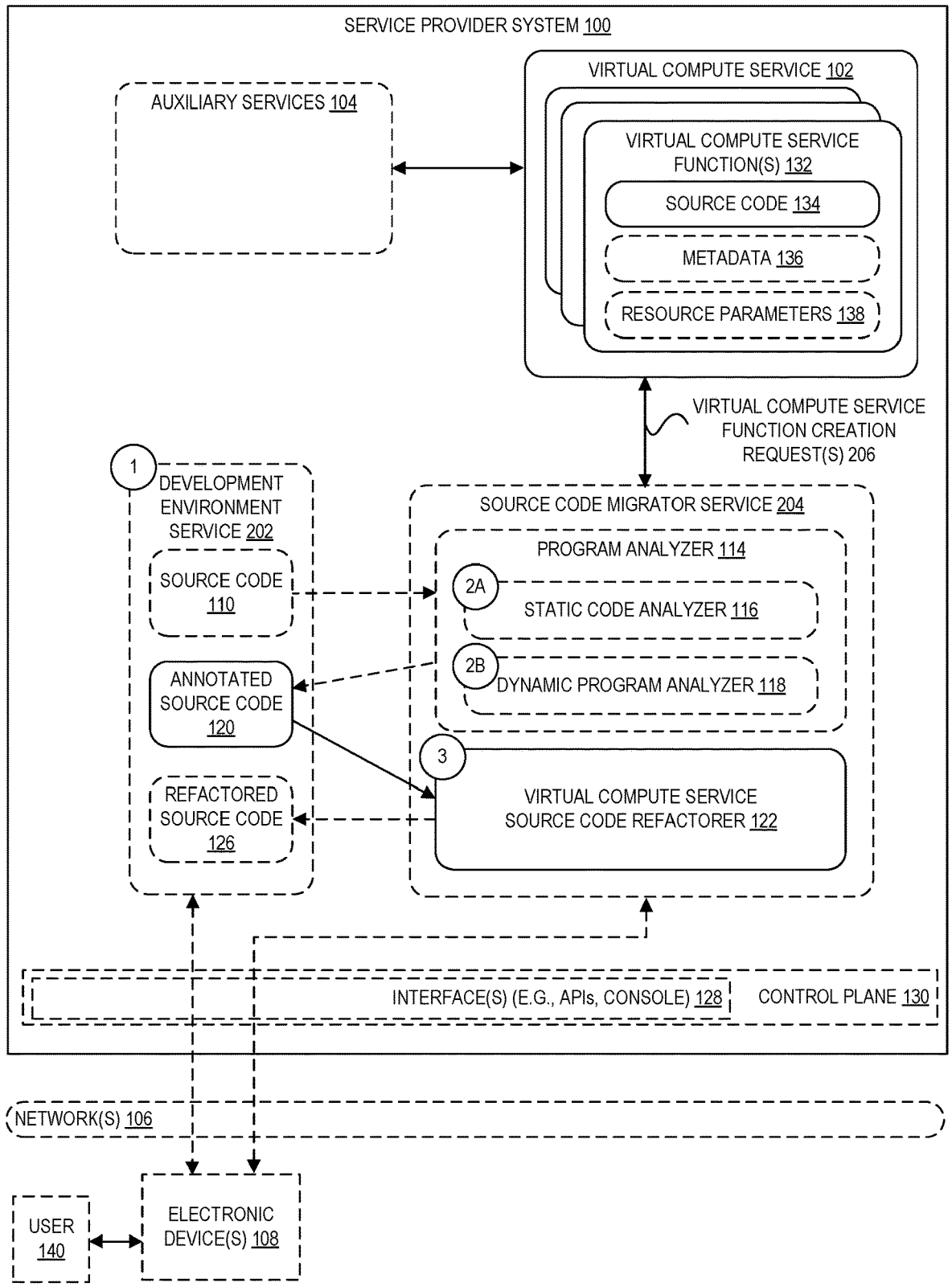
FIG. 2 is a block diagram illustrating another example environment including components used to migrate computer program source code to a virtual compute service of a service provider system according to some embodiments.

FIG. 2 is a block diagram illustrating another example environment including components used to migrate computer program source code to a virtual compute service of a service provider system, according to some embodiments. Similar to FIG. 1, a virtual compute service 102 and other auxiliary services 104 operate as part of a service provider system 100. In FIG. 2, a service provider system 100 further includes a source code migrator service 204 that can be used to coordinate the migration of source code to the service provider system 100. FIG. 2 further illustrates a development environment provided by a service provider system 100 as a development environment service 202.

Similar to FIG. 1, the circle labeled "1" in FIG. 2 shows source code 110 which may have been developed by a user 140 using a development environment service 202 (for example, using a web browser or other application used to access the development environment service 202). A user may use a development environment service 202, for example, to create the source code 110 and to build and deploy the source code such that it can can be executed by one or more computing devices (for example, computing devices provisioned and managed at the service provider system 100).

In an embodiment, at circles "2A" and "2B" in FIG. 2, the source code 110 optionally can be analyzed by components of a program analyzer 114 provided as part of a source code migrator service 204, similar to the analysis of the source code in FIG. 1 by the source code migrator 142. At circle "2A," for example, the source code 110 may be analyzed by a static code analyzer 116 to identify portions of the source code that may be suitable for migration to a virtual compute service. At circle "2B," a dynamic program analyzer 118 can be used, possibly in combination with the static code analyzer 116, to analyze an executing computer program derived from the source code 110 to identify candidate portions of the source code for migration by a source code migrator 142. The analysis of source code 110 by a static code analyzer 116, a dynamic program analyzer 118, or both, may result in the generation of annotated source code 120. In some embodiments, the analysis of source code 110 by a source code migrator service 204 can be initiated by a user interacting with either a development environment service 202 or the source code migrator service 204. For example, a user may access one or both of the services using a web browser, console application, or any other interface 128 and provide input requesting the analysis of the source code 110 by a program analyzer 114. In other embodiments, the analysis of the source code 110 can be performed automatically without input from the user, for example, as part of a build and deploy or other process.

Figure 3:
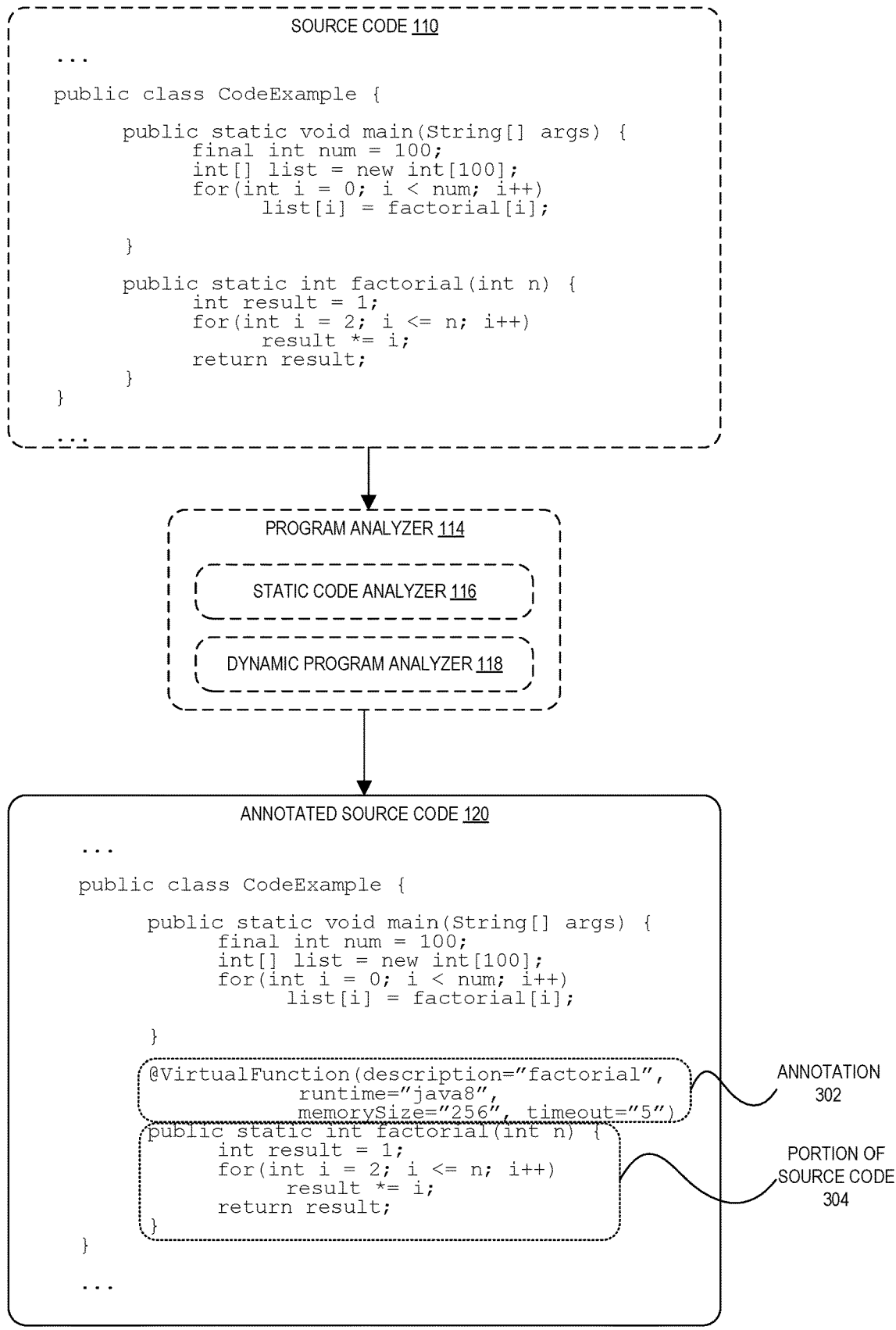
FIG. 3 is a diagram illustrating operation of a program analyzer as part of a system for migrating source code to a virtual compute service according to some embodiments.

FIG. 3 is a diagram illustrating use of a program analyzer 114 to analyze example source code 110 resulting in the generation of annotated source code 120. In FIG. 2, source code 110 is shown including an example section of a computer program's source code. In the example, the section of source code defines a class named "CodeExample" which includes two methods named "main" and "factorial," respectively. The "main" method includes the initialization of a variable "list" (initially an empty array) and further includes a loop that inserts values into the array based on values returned from the separate "factorial" method.

As indicated above, in an embodiment, a program analyzer 114 obtains source code 110 for analysis and may generate annotated source code 120 based on the analysis. For example, the program analyzer 114 may be part of a source code editor or IDE, a plug-in to a source code editor or IDE, a compiler plug-in, a plug-in to a build and deploy tool, or any other type of process that can access the source code 110. A user 140 developing the source code 110 in an IDE, for example, may desire to have the source code 110 analyzed for possible migrations to a virtual compute service 102 and thus cause execution of an IDE plugin that performs some or all of the operations described herein in relation to a program analyzer 114.

In an embodiment, a static code analyzer 116 analyzes the source code 110 in its plain text form to determine whether portions of the source code may be suitable for replication by virtual compute service functions 132 of a virtual compute service 102. In one embodiment, the analysis of source code 110 by a static code analyzer 116 can include the generation of a control flow graph, or "call graph," representing relationships between various portions of the source code (for example, calling relationships among various classes, methods, subroutines, and so forth, defined in the code). A call graph can be represented by a plurality of nodes, each representing a portion of the source code (for example, a particular class, function, subroutine, or other element), and edges, each representing a calling relationship between two portions of the source code (for example, an edge connecting two nodes may indicate that a method A calls another method B during execution of the source code).

In an embodiment, a program analyzer 114 can use a call graph to identify candidate portions of code for migration to a virtual compute service 102. For example, the program analyzer 114 may identify leaf nodes of the call graph as potential candidates since these nodes typically represent relatively atomic functional elements of a computer program. A program analyzer 114 may also identify other non-leaf candidate source code portions, for example, based on a number of dependencies of the code as indicated by a number of directed edges from the node leading to other nodes. Portions of code represented by nodes having calling relationships to many other nodes, for example, may not be as well suited for migration to a virtual compute service compared to other portions of codes having fewer calling relationships.

Figure 4:
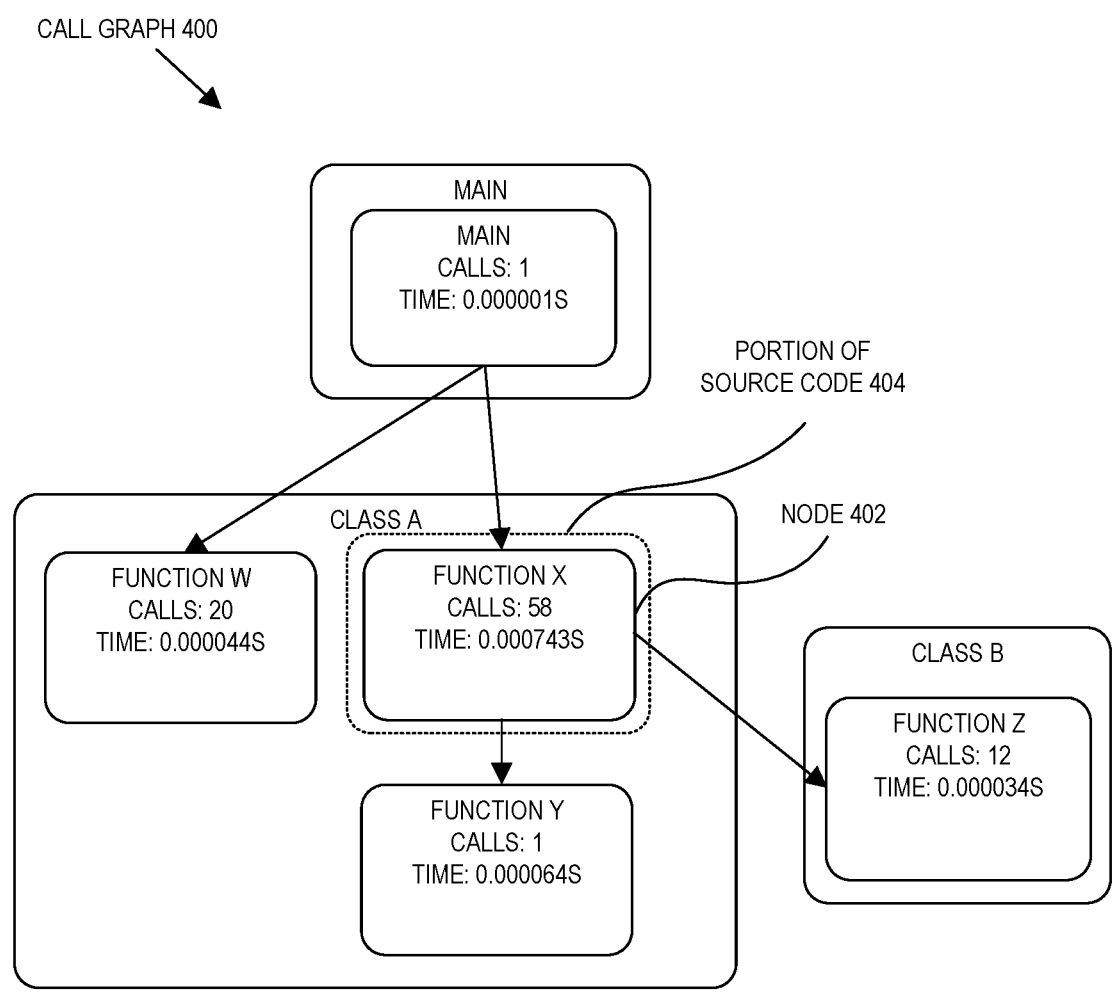
FIG. 4 is a diagram illustrating an exemplary call graph generated by a program analyzer according to some embodiments.

FIG. 4 is a diagram illustrating an exemplary call graph generated by a program analyzer. As illustrated, the call graph 400 includes a several nodes including, for example, a node 402 representing a portion of source code 404. The node 402, for example, may correspond to a particular class, function, or other portion of the overall source code for which the graph 400 is generated. As shown, some of the nodes in the call graph 400 are associated with directed edges showing calling relationships to other nodes of the graph. For example, an edge is shown connecting the node labeled "main" to the node 402, indicating that in the source code a method named "main" calls the function X represented by the node 402. As indicated above, a call graph structure, such as that illustrated in FIG. 4, may be used by a program analyzer 114 to automatically identify portions of the code that may be suitable for replication by one or more virtual compute service functions, for example, based on each node's position in the call graph, a number of dependencies associated with each node, or any other factors derivable from the call graph or combinations thereof.

Returning to FIG. 1 and FIG. 2, a program analyzer 114 may additionally or alternatively include a dynamic program analyzer 118. In an embodiment, a dynamic program analyzer 118 can be used to analyze the execution of source code, such as source code 110, to determine runtime characteristics of the source code. For example, a dynamic program analyzer 118 may be used to determine, for separate portions of the source code, various characteristics such as an amount of compute time used to execute the portion of code (including, for example, total, minimum, maximum, and average compute times), memory usage, a number of times each portion of code is called during execution, and so forth. In an embodiment, a dynamic analysis of source code 110 can include executing the source code with a variety of inputs to test the operation of the source code under different conditions.

In an embodiment, resource usage information generated by a dynamic program analyzer 118 can be used to further assist with the automatic identification of portions of the source code which may be suitable for replication as virtual compute service functions 132. As one example, a virtual compute service 102 may impose certain limits on the execution of virtual compute service functions including, for example, an amount of memory that can be allocated, a maximum number of threads, a maximum execution time, and so forth. The resource usage information collected for portions of the source code thus may be used by a program analyzer 114 to determine whether one or more portions of the source code can be implemented as a virtual compute service function under the imposed constraints.

As another example, the resource usage information can be used as part of a request to a virtual compute service 102 to create a virtual compute service function as parameters related to execution of the function at the virtual compute service 102 (for example, to specify resource parameters 138 indicating an amount of memory to allocate to the function, a maximum amount of compute time to allow for the function, and so forth). In some embodiments, if the resource usage information associated with a portion of source code is determined to exceed one or more limits imposed by a virtual compute service 102, this information can be used by a source code migrator 142 to attempt further dividing the portion of source code into two or more separate sub-portions, one or more of which may be suitable for execution by the virtual compute service 102 on its own. In other examples, two or more nodes representing separate portions of source code that are within the virtual compute service's operating constraints may be combined to create a single virtual compute service function 132 replicating the operations of both portions.

For example, the call graph illustrated in FIG. 4 includes resource usage information associated with several of the nodes of the call graph 400, including a number of times each node is called by another node in the graph and a total amount of compute time used to execute each of the nodes. As indicated above, other types of resource usage information that may be collected by a dynamic program analyzer 118 and associated with nodes of a call graph 400 include, but are not limited to, an amount of memory used by each of the nodes, a minimum, maximum, and average amount of compute time used, a number of threads used, and so forth.

In one embodiment, a call graph, such as call graph 400, can be used by a program analyzer 114 as an internal representation of analyzed source code and to automatically determine candidate portions of the source code 110 for replication, as described above. In other embodiments, a program analyzer 114 may additionally or alternatively generate a graphical representation of a call graph 400 for display to a user in a graphical user interface (GUI) to allow a user to better understand the operation of source code. A user may use this information, for example, to manually associate metadata with the source code based on the information in the call graph in combination with the user's knowledge of the source code's operation.

As indicated above, the analysis of source code 110 by a program analyzer 114 may result in the generation of annotated source code 120, where the annotated source code includes metadata identifying one or more portions of the source code which may be suitable for migration to a virtual compute service 102. A program analyzer 114 may automatically generate metadata associated with annotated source code 120, for example, based on the generation and analysis of call graphs for the source code, as described above. Alternatively or additionally, a user 140 may manually associate metadata to identify one or more portions of the source code, for example, by inserting annotations or other metadata into the source code. In some embodiments, a development environment 112 may prompt the user to review and possibly modify annotations automatically annotated by a program analyzer 114.

In one embodiment, the metadata associated with the source code can include annotations inserted into the source code. These annotations can be used to assist a virtual compute service source code refactorer 122 in creating one or more virtual compute service functions corresponding to the identified source code and to modify at least some of the source code such that the virtual compute service functions are invoked upon execution of the source code. For example, the annotated source code 120 in FIG. 3 includes an annotation 302 identifying a portion of source code 304 defining a "factorial" function. As shown, the annotation 302 includes various parameters related to the generation of a virtual compute service function based on the identified source code.

For example, the parameters of the annotation 302 include specification of a name for the function at the virtual compute service 102 ("factorial"), a runtime environment to use to execute the source code 304 ("java8"), an amount of memory to allocate to the function ("256"), and a number of minutes after which the virtual compute service 102 is to terminate execution of the function ("5"). The annotated source code 120 of FIG. 3 shows an example annotation for source code written in the Java programming language; the syntax for annotations in other programming language may differ depending on syntax rules for each individual programming language.

Returning to FIG. 1 and FIG. 2, at circle "3," the annotated source code 120 is processed by a virtual compute service source code refactorer 122 to create one or more virtual compute service functions 132 and, optionally, refactored source code 126. In an embodiment, a virtual compute service source code refactorer 122 analyzes the annotated source code 120 for the presence of metadata identifying one or more portions of the source code (for example, based on annotations included in the source code or other metadata), creates one or more virtual compute service functions 132 based on the metadata, and optionally modifies, or "refactors," the annotated source code 120 to generate refactored source code 126, which is configured to invoke the created virtual compute service functions at the appropriate times during execution.

Figure 5:
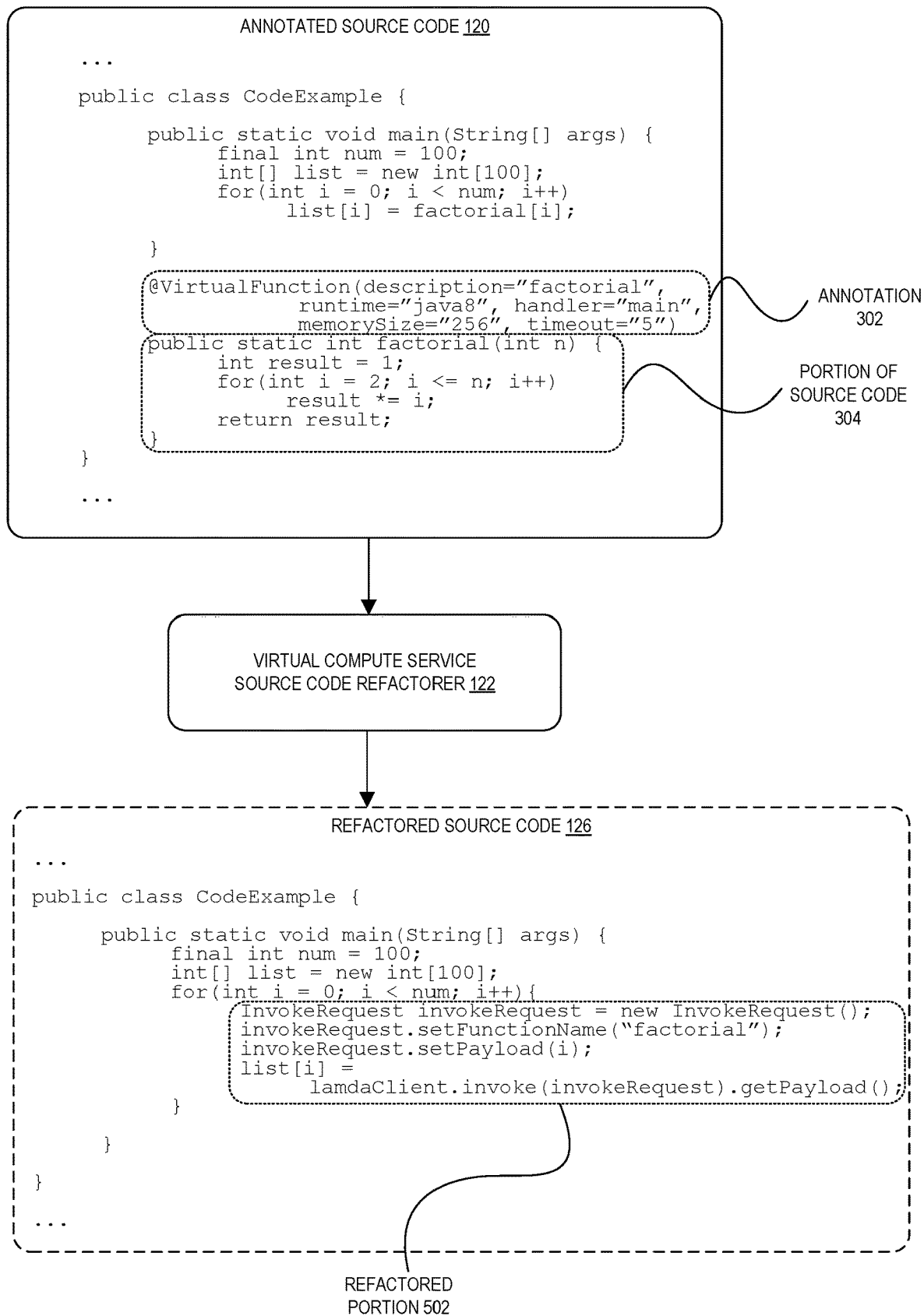
FIG. 5 is a diagram illustrating an exemplary refactoring of annotated source code by a virtual compute source code refactorer according to some embodiments.

FIG. 5 is a diagram illustrating an exemplary refactoring of annotated source code by a virtual compute service source code refactorer. In FIG. 5, annotated source code 120, including an annotation 302 identifying a portion of source code 304, is processed by a virtual compute service source code refactorer 122, resulting in refactored source code 126. As shown, the refactored source code 126 includes a refactored portion 502 which has been modified to cause an associated virtual compute service function 132 to be invoked in place of the portion of the source code 304. In some other examples, the entire functionality of the annotated source code 120 can be migrated to a virtual compute service 102 based on the defined annotations; in these instances and others, refactored source code 126 may not be generated since the execution of the migrated source code can be performed entirely at a service provider system 100.

Similar to the program analyzer 114 described above, a virtual compute service source code refactorer 122 of a source code migrator 142 may be part of a source code editor plug-in or IDE plug-in, part of a build and deploy tool, part of a source code migrator service 204, or a standalone application or any other process. For example, a user 140 developing source code 110 that has been associated with metadata resulting in annotated source code 120 may desire to refactor the code such that the functionality represented by the annotated portions of the code is implemented by one or more virtual compute service functions 132 at the virtual compute service 102 and, if some portions of the annotated source code 120 are not migrated to the virtual compute service 102, such that the remaining source code causes invocation of the created functions instead of performing the corresponding functionality locally. In this example, the user 140 may select an option to refactor the code while the code is being developed, when the source code is compiled, or at any other point in time.

In one embodiment, the refactoring of source code can be performed when the source code is migrated generally to a service provider system 100 for execution by computing resources of the service provider system 100 (for example, a hardware virtualization service, a storage virtualization service, or other auxiliary services 104). In this manner, the migration of the source code 110 can be a part of a larger overall migration of the user's computing resources to the service provider system 100.

In an embodiment, annotated source code 120 further can be refactored any number of times as the user continues the develop the source code using the user's preferred development environment 112. A virtual compute service source code refactorer 122 can then be used to ensure that corresponding virtual functions 132 created at a virtual compute service 102 stay in sync with the user's locally developed source code, or that more or fewer virtual compute service functions are created in response to changes in the annotations associated with annotated source code 120. In other examples, a user can directly modify virtual compute service functions 132 created at the virtual compute service 102 to modify their behavior, if desired.

As indicated above, the refactoring of annotated source code 120 by a virtual compute service source code refactorer 122 can include the creation of one or more virtual compute service functions 132 based on one or more identified portions of the annotated source code 120. The one or more virtual compute service functions 132 may generally serve as an alternative implementation of the actions specified by the identified portions of the annotated source code 120. In one embodiment, a virtual compute service source code refactorer 122 creates the one or more virtual compute service functions by sending one or more function creation requests 124 to the virtual compute service 102. For example, a virtual compute service source code refactorer may send one or more API requests via an interface 128 to create the one or more virtual compute service functions 132, where the request include parameters specifying the source code 134, metadata 136, and resource parameters 138 used to define the virtual compute service function(s).

In an embodiment, generating a function creation request 124 for a particular portion of annotated source code 120 includes packaging the source code in a format accepted by the virtual compute service 102. For example, the packaging of the source code may include one or more of the following operations: obtaining a copy of the source code contained in the annotated portion of code (or a version of the portion of the code modified to operate in the virtual compute service 102), obtaining any code dependencies related to the annotated portion of code (for example, any source code outside of the identified portion, including libraries and other code, upon which the annotated source code depends), creating a file directory structure to store the obtained source code and any dependencies, creating a storage location at the service provider system to store the packaged code, uploading the packaged code to the created storage location. In one embodiment, the generation of a function creation request 124 may involve packaging any dependencies and libraries for each function to be created individually; in other embodiments, some code dependencies and libraries can be packaged as a separate collection and used by multiple virtual compute service functions 132 at the virtual compute service 102.

In addition to the packaged source code, in some embodiments, generating a function creation request 124 may include obtaining other metadata and parameters to be sent as part of the request 124 (for example, including various metadata 136 and resource parameters 138). For example, some or all of the obtained metadata and parameters may be obtained from the annotation 302, inferred from the source code, set using default values, or combinations thereof.

In an embodiment, the creation of one or more of the virtual compute service functions 132 by a virtual compute service source code refactorer 122 can include the creation of one or more functions to be triggered by one or more auxiliary services 104. For example, if an annotated portion of source code is configured to perform one or more operations in response to data being stored at a storage virtualization service, a corresponding virtual compute service function 132 may be created that is invoked whenever data is stored in the storage virtualization service (as described above, by configuring the virtual compute service function to be triggered by events from the storage virtualization service). The annotated source code can then be refactored, for example, to receive a message whenever the virtual compute service function is invoked, but without calling the virtual compute service function directly.

In an embodiment, the creation of one or more virtual compute service functions 132 can include creating two or more functions 132 that pass control flow from one function to another during execution. For example, one or more portions of annotated source code 120 may be converted into two or more separate virtual compute service functions that use a message queuing system or other mechanism for passing control flow from one function to another, and back to the refactored source code, when appropriate. The execution of a virtual compute service function at a virtual compute service 102, for example, may result in the function adding a message to a message queue or database, where the message indicates that the virtual compute service function has completed execution. A different virtual compute service function, or the refactored source code, can be created or modified such that execution of the function or refactored source code monitors the message queue or database to determine when control flow returns to the function or refactored source code.

As indicated above, refactoring the annotated source code 120 may include modifying the source code. In some embodiments, the modification of the annotated source code 120 to generate refactored source code 126 may replace the annotated source code, such that the annotated source code is made available to the user for further modification, if desired. In other embodiments, the refactored source code 126 may be a temporary version of the annotated source code that is generated (for example, during a build and deploy process) only for the purposes of generating an executable version of the source code. In this example, a user may continue to develop and modify the annotated source code 120, for example, to make changes to the logic included in one or more of the annotated portions. Subsequent modifications to portions of the annotated source code 120 may then result in the virtual compute service source code refactorer 122 sending one or more requests to update the source code of the corresponding virtual compute service functions at the virtual compute service 102. In this manner, the annotations can be used to automatically keep the annotated source code 120 and virtual compute service functions 132 in sync with one another. In yet other examples, the annotated source code 120 may not be generated if the entirety of the annotated source code 120 can be migrated to the virtual compute service 102.

Figure 6:
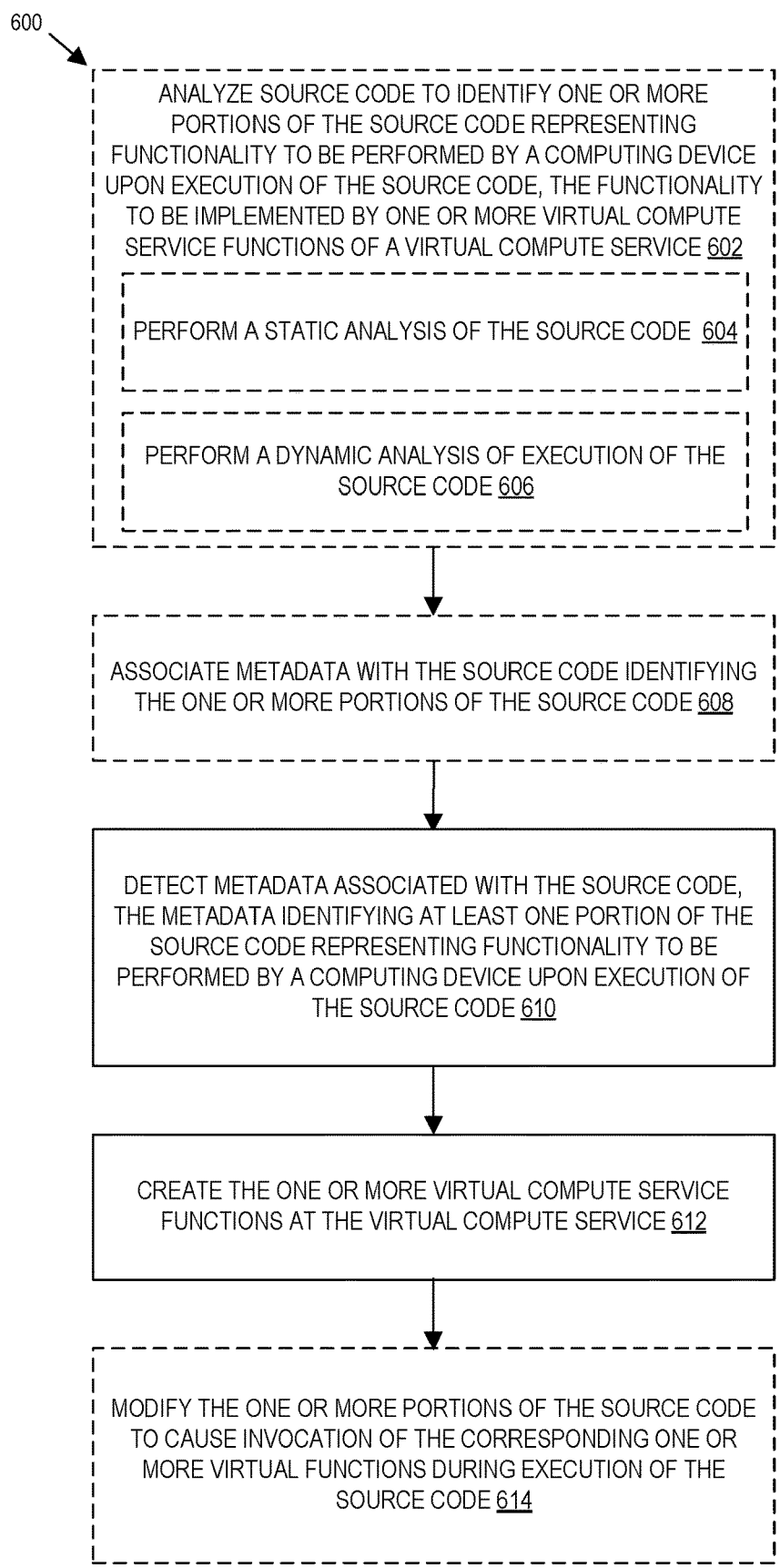
FIG. 6 is a flow diagram illustrating operations for migrating a computer program source code to a virtual compute service according to some embodiments.

For further details of a process for migrating source code to a virtual compute service, FIG. 6 is a flow diagram illustrating operations 600. Some or all of the operations 600 (or other processes described herein, or variations, or combinations thereof) are performed under the control of one or more computer systems configured with executable instructions and are implemented as code (for example, executable instructions, one or more computer programs, or one or more applications) executing collectively on one or more processors by hardware or combinations thereof. The code can be stored on a computer-readable storage medium, for example, in the form of a computer program comprising instructions executable by one or more processors. The computer-readable storage medium is non-transitory. In some embodiments, one or more (or all) of the operations 600 are performed by electronic device(s) 108 or other computing systems, which may be part of or separate from a service provider system 100, and possibly other components of the other figures.

In some embodiments, the operations 600 include, at block 602, optionally analyzing source code to identify one or more portions of the source code to be replicated by one or more virtual compute service functions of a virtual compute service. Referring again to FIG. 1, for example, a program analyzer 114, including a static code analyzer 116 and a dynamic program analyzer 118, may be used to analyze source code 110 in plaintext form, analyze execution of the source code 110, or both. As shown in FIG. 2, in some embodiments, the analysis of source code 110 can be performed by a program analyzer 114 of a source code migrator service 204 provided by a service provider system 100. For example, a user 140 may use an electronic device 108 to interact with a development environment service 202, source code migrator service 204, or both, via one or more networks 106 and provide input requesting the analysis of the source code 110. In other embodiments, the analysis of the source code 110 can be performed automatically without user input.

At block 604, for example, a static analysis of the source code is optionally performed. In an embodiment, a static analysis of the source code includes an analysis of the source code in its plain text format and may include generating a call graph, where the call graph includes one or more nodes representing respective portions of the source code and one or more edges representing calling relationships among the portions of source code. In an embodiment, if a static analysis of the source code is performed, at least one annotation may be inserted into the source code identifying at least one of the portions of the source code represented by a node of the call graph. For example, the annotation may be automatically inserted and identify a portion of code based on one or more of: its position in the corresponding call graph, a number of dependencies exhibited by the portion of source code, or any other factors.

At block 606, a dynamic analysis of the source code's execution is optionally performed. In an embodiment, dynamic analysis of the source code's execution includes, possibly in combination with the static analysis of the source code at block 604, the generation of a call graph including resource usage information. For example, the generation of a call graph based on a dynamic analysis of execution of the source code can include generating one or more nodes and edges, where at least one of the nodes is associated with resource usage information collected based on monitoring execution of a corresponding portion of source code. In an embodiment, the resource usage information can relate to one or more of: compute time, memory usage, hit counts, or any other performance measurements related to execution of the source code.

In an embodiment, the resource usage information can be used by a dynamic program analyzer 118 to insert at least one annotation into the source code identifying at least one portion of the source code. For example, the automatic insertion of an annotation may be based on a determination that the resource usage information for a particular node is within processing constraints imposed by a virtual compute service. In one embodiment, the resource usage information associated with a node may be used by a dynamic program analyzer 118 to annotate a portion of code to create two or more virtual compute service functions for the annotated portion of code (for example, because the resource usage information indicates that execution of the identified portion of source code exceeds one or more operating constraints imposed by the virtual compute service 102).

At block 608, metadata optionally can be associated with the source code based on the analysis of the source code, as described in blocks 602-606. In an embodiment, the portions of the source code identified by the metadata represent functionality to be alternatively implemented by one or more virtual compute service functions of a virtual compute service. These alternative implementations of the functionality, for example, replicate the actions defined by the portions of the source code at a virtual compute service 102. In one embodiment, the metadata comprises annotations inserted into the code conforming to a syntax of the programming language in which the source code is written. As shown in FIG. 3, for example, an annotation 302 can be inserted into source code to identify one or more portions of source code 304. In other examples, metadata can be associated with source code manually by a user, for example, by a user manually creating one or more annotations 302 using a source code editor or other application.

At block 610, metadata associated with source code is detected, the metadata identifying one or more portions of the source code, each of the one or more portions of the source code representing functionality to be performed by a computing device upon execution of the source code. In an embodiment, the functionality represented by the identified portions of the source code correspond to one or more actions to be performed when the source code is executed. For example, a virtual compute service source code refactorer 122 may parse annotated source code 120 to identify the metadata (for example, annotations included in the source code) or otherwise obtain metadata associated with the source code.

At block 612, at least one virtual compute service function is created based on the metadata identified at block 610. In one embodiment, the creation of the at least one virtual compute service function can include sending one or more requests to the virtual compute service to create the one or more virtual compute service functions (for example, by a source code migrator 142 or source code migrator service 204). For example, a virtual compute service source code refactorer 122 may send one or more function creation requests 124 to the virtual compute service 102.

In one embodiment, sending a function creation request 124 to the virtual compute service 102 to create a virtual compute service function 132 can include identifying dependent source code upon which the portion of source code depends, packaging the source code and dependent source code in a format accepted by the virtual compute service to obtain packaged code, and sending the request to the virtual compute service to create the virtual compute service function including the packaged code. For the example, the packaged source code may include the source code in the identified portion (or a modified version thereof) and any dependent libraries or source code external to the identified portion of source code.

In an embodiment, the metadata identifying a portion of the source code may include one or more resource parameters related to execution of one or more virtual compute service functions used to replicate the portion of the source code, and the request to the virtual compute service to create the one or more virtual compute service functions can include one or more of the resource parameters. For example, the metadata may include resource parameters and metadata such as, for example, a name of the virtual compute service function, an amount of memory to allocate to the function, a timeout for terminating execution of the function, and so forth. One or more of these parameters may be included in the request, for example, as parameters of an API call to the virtual compute service 102.

In one embodiment, sending a function creation request 124 to the virtual compute service 102 can include sending two or more requests to create two or more virtual compute service functions, wherein at least one of the two or more virtual compute service functions is configured to invoke another of the two or more virtual compute service functions during execution. In this manner, the execution of virtual compute service functions replicating one or more portions of annotated source code 120 can be "chained" together as part of the overall program control flow. This may be useful, for example, if a combination of the two or more virtual compute service functions may exceed execution constraints imposed by a virtual compute service 102, or to make the functions more scalable as independent execution units. In one embodiment, the passing of control flow between two or more virtual compute service functions, and between virtual compute service functions and annotated source code 120, can be based on a message queuing service to pass control messages or any other program control flow mechanism.

At block 614, optionally, the original source code containing the identified portions of the source code can be modified to cause invocation of virtual compute service functions during execution of the source code. For example, the source code may be modified by a virtual compute service source code refactorer 122 as part of a build and deploy process or at any other time. In an embodiment, modification of the source code can include modifying the source code such that, upon execution, the source code makes one or more API calls to a virtual compute service to invoke the corresponding virtual compute service functions, sends one or more event messages to a message queue causing invocation of the functions, or performs any other actions to invoke the functions. For example, as illustrated in FIG. 5, a refactored portion 502 of the source code can be added to replace the original portion of source code 304 and to cause invocation of a created virtual compute service function, which function serves as an alternative implementation of the functionality represented by the portion of source code 304.

In an embodiment, in response the creation of the one or more virtual compute service functions, one or more identifiers associated with the virtual compute service functions may be received from the virtual compute service. The modification of the source code to cause invocation of the corresponding one or more virtual compute service functions can include inserting in the source code one or more instructions to generate API calls using the one or more identifiers. In other examples, the modification of the source code can include inserting one or more instructions causing one or more event messages to the be sent to the virtual compute service (or to another service), the event messages causing invocation of the one or more identified virtual compute service functions.

In an embodiment, after an initial refactoring of the source code, updates to a portion of source code identified by the metadata can be detected and, in response, any corresponding virtual compute service functions associated with the portion of the source code can be updated at the virtual compute service. For example, a source code migrator 142 may automatically detect when a user has subsequently modified any annotated source code 120, or may detect an update in response to a user requesting a subsequent refactoring of annotated source code 120. The updates, for example, may change some of the actions associated with the portion of source code and thus those updates can be reflected in any corresponding virtual compute service functions such that the annotated source code 120 and any corresponding virtual compute service functions 132 stay in sync with one another.

Figure 7:
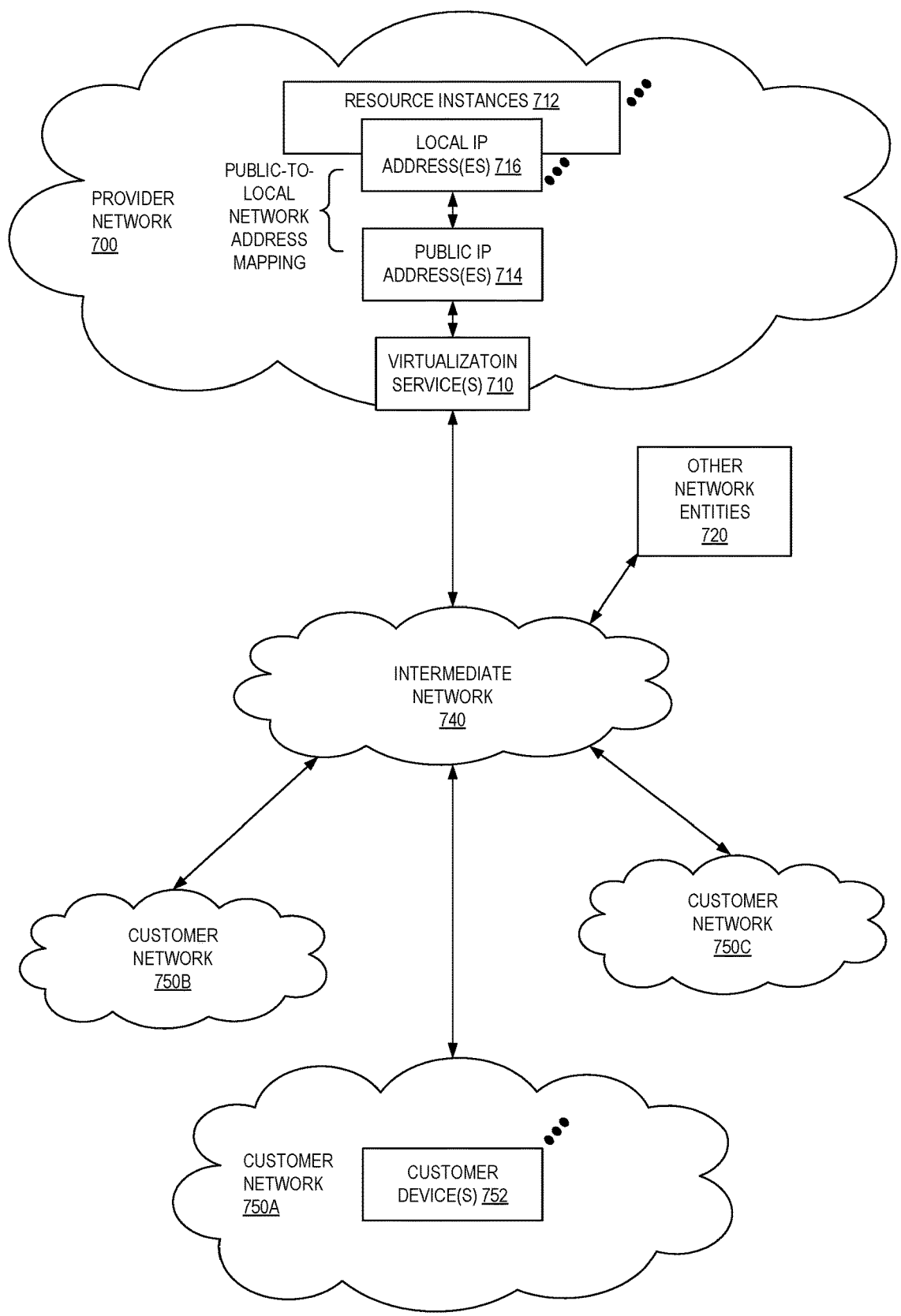
FIG. 7 illustrates an example service provider network environment according to some embodiments.

FIG. 7 illustrates an example provider network (for example, part of a "service provider system") environment, according to some embodiments. A provider network 700 may provide resource virtualization to customers via one or more virtualization services 710 that allow customers to purchase, rent, or otherwise obtain instances 712 of virtualized resources including, but not limited to, computation and storage resources. The virtualization service 710 can be implemented on devices within the provider network or networks in one or more data centers. Local IP addresses 716 may be associated with the resource instances 712; where the local IP addresses are the internal network addresses of the resource instances 712 on the provider network 700. In some embodiments, the provider network 700 may also provide public IP addresses 714 and/or public IP address ranges (for example, Internet Protocol version 4 (IPv4) or Internet Protocol version 6 (IPv6) addresses) that customers may obtain from the provider 700.

Conventionally, the provider network 700, via the virtualization services 710, may allow a customer of the service provider (for example, a customer that operates client network 750A) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network 750A may, for example, implement customer-specific applications and present the customer's applications on an intermediate network 740, such as the internet. Other network entities 720 on the intermediate network 740 may then generate traffic to a destination public IP address 714 published by the customer network 750A; the traffic is routed to the service provider data center and, at the data center, is routed via a network substrate to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal network addresses of resource instances in a provider network. Local IP addresses are only mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are internet mutable network addresses that are assigned to resource instances, either by the service provider or by the customer. Traffic routed to a public IP address is translated, for example, via 1:1 network address translation (NAT), and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example, via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
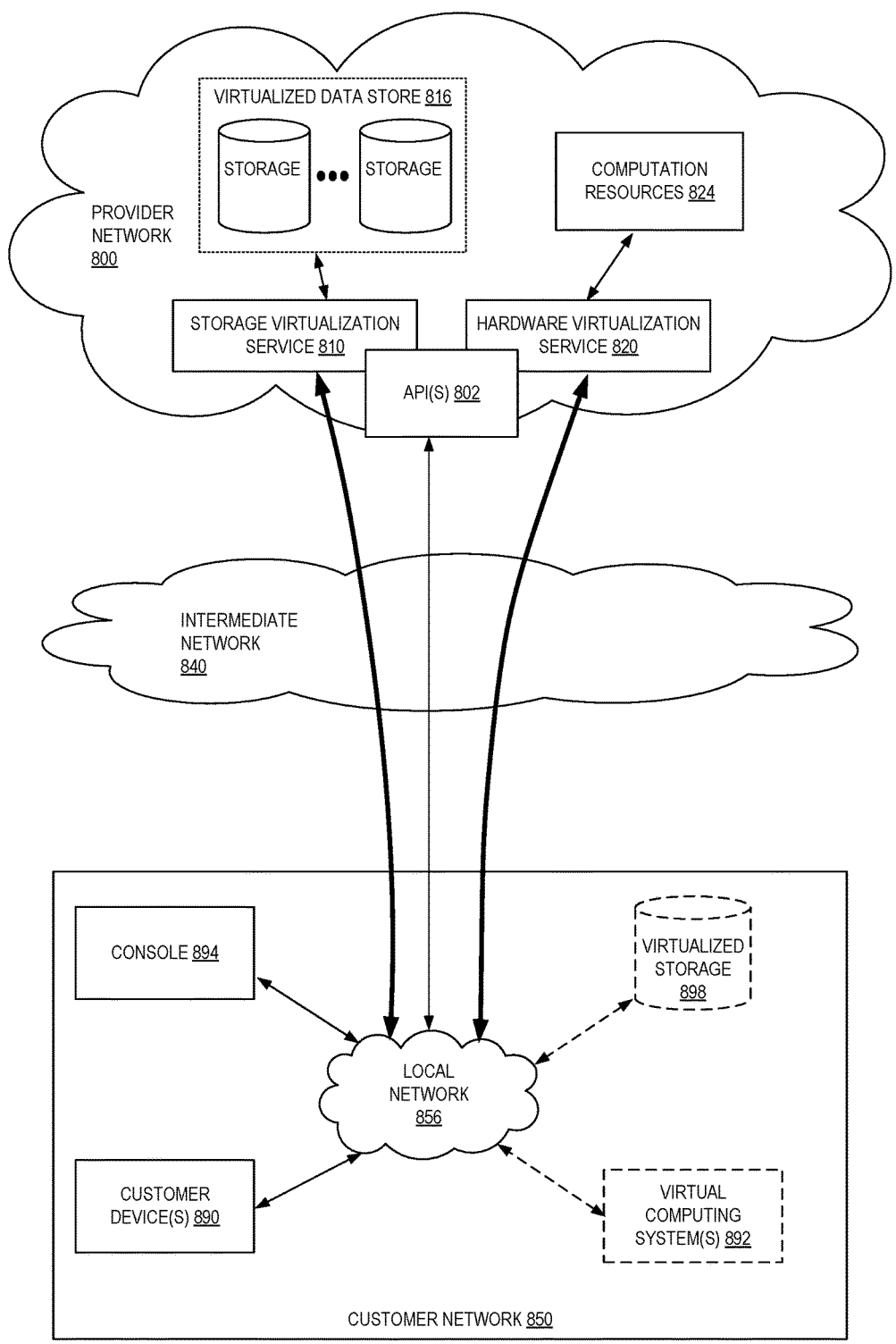
FIG. 8 is a block diagram of an example service provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (for example, VMs) to customers. The computation resources 824 may, for example, be rented or leased to customers of the provider network 800 (for example, to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example, coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example, a web services interface, via which a customer network 850 may access functionality provided by the hardware virtualization service 820, for example, via a console 894. In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 or console 894, the customer may access the functionality of storage virtualization service 810, for example, via one or more APIs 802, to access data from and store data to a virtual data store 816 provided by the provider network 800. In some embodiments, a virtualized data store gateway (not shown) may be provided at the customer network 850 that may locally cache at least some data, for example, frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
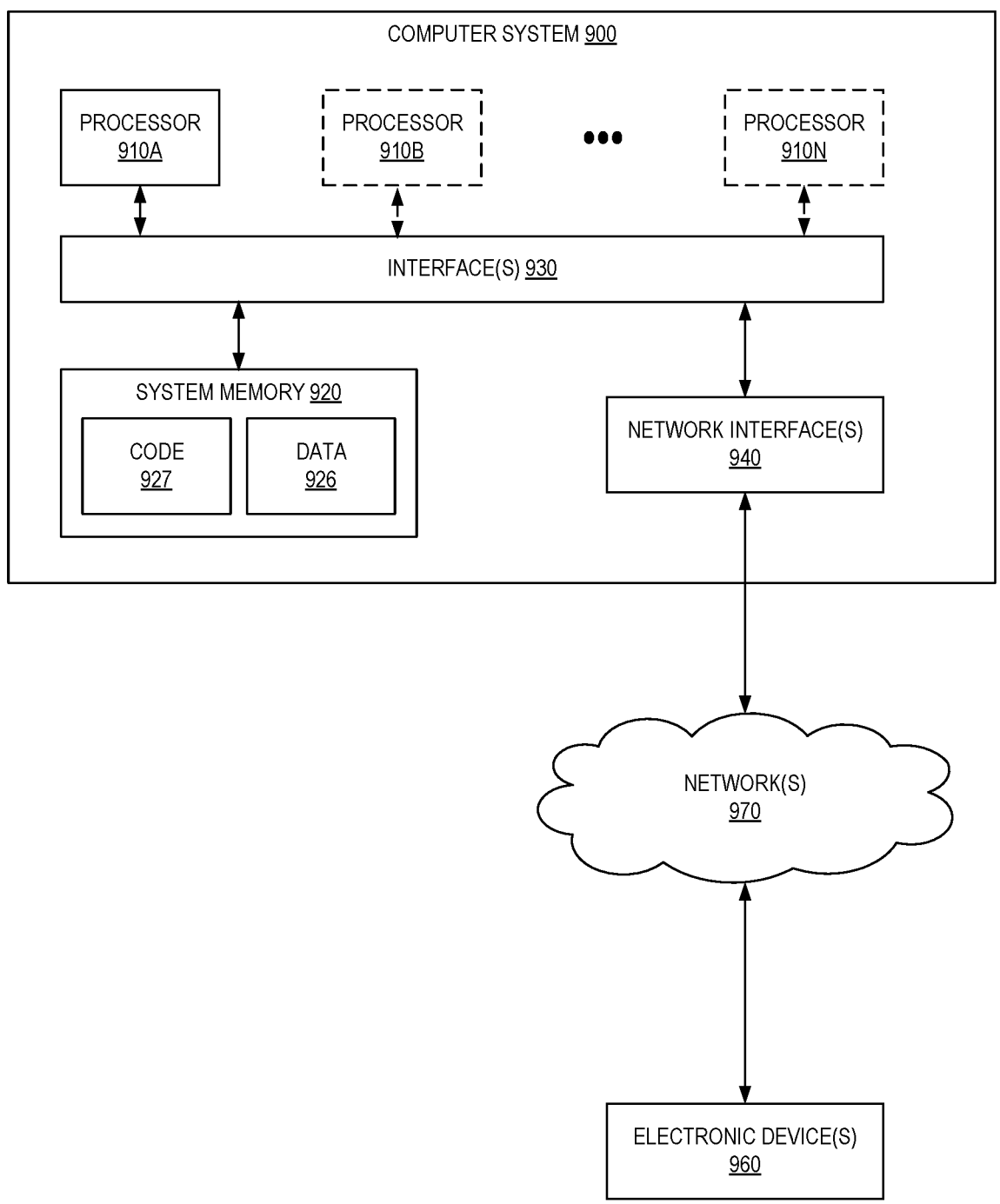
FIG. 9 is a block diagram illustrating an example computer system that may be used in some embodiments.

In some embodiments, a system that implements a portion or all of the techniques for migrating computer program source code to a virtual compute service of a service provider system environment as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (for example, two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (for example, system memory 920) into a format suitable for use by another component (for example, processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1 and FIG. 2, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via I/O any other suitable type of network and/or protocol.

In some embodiments, system memory 920 may be one embodiment of a computer-accessible medium configured to store program instructions and data for implementing a server migration service in a provider network environment. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 900 via I/O interface 930. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending, or storing instructions and/or data implemented in accordance with the foregoing description upon a computer-accessible medium. A computer-accessible medium may include storage media or memory media such as magnetic or optical media, for example, disk or DVD/CD-ROM, volatile or non-volatile media such as RAM (for example, SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the figures and described herein represent exemplary embodiments of methods. The methods may be implemented in software, hardware, or a combination thereof. The order of the methods may be changed, and various elements may be added, reordered, combined, omitted, modified, etc. Thus, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method comprising:
    generating a call graph based at least in part on a dynamic analysis of execution of first source code, the call graph including one or more nodes representing respective portions of the first source code and one or more edges representing calling relationships among the respective portions of the first source code, wherein at least one of the one or more nodes is associated with resource usage information collected based on monitoring execution of a corresponding respective portion of the first source code, and wherein the resource usage information relates to at least one of: compute time, memory usage, or hit counts;
    determining, based on resource usage information associated with a node of the one or more nodes, to insert into the first source code an annotation identifying the respective portion of the first source code associated with the node;
    inserting the annotation into the first source code;
    detecting, by a source code migrator of a source code development environment, the annotation identifying the portion of the first source code, wherein the portion of the first source code represents functionality to be performed by a computing device upon execution of the portion of the first source code, wherein the annotation indicates a request to migrate execution of the portion of the first source code to a virtual compute service, and wherein the annotation includes a resource parameter related to computing resources to be obtained by the virtual compute service to execute the portion of the first source code;
    sending, by the source code migrator, a request to the virtual compute service to create at least one virtual compute service function at the virtual compute service based on the portion of the first source code identified by the annotation, wherein the request sent by the source code migrator includes second source code that implements the functionality represented by the portion of the first source code and further includes the resource parameter, and wherein the virtual compute service automatically provisions, based on the resource parameter, computing resources used to execute the at least one virtual compute service function upon invocation of the at least one virtual compute service function; and
    modifying the first source code to cause invocation of the at least one virtual compute service function at the virtual compute service during execution of the first source code.

2. The computer-implemented method of claim 1, further comprising:
    generating the call graph based at least in part on a static analysis of the first source code, the call graph including the one or more nodes representing the respective portions of the first source code and the one or more edges representing calling relationships among the respective portions of the first source code; and
    inserting at least one annotation into the first source code identifying at least one of the respective portions of the first source code represented by a node of the call graph.

3. A computer-implemented method comprising:
    generating a call graph based at least in part on a dynamic analysis of execution of first source code, the call graph including one or more nodes representing respective portions of the first source code and one or more edges representing calling relationships among the respective portions of the first source code, wherein at least one of the one or more nodes is associated with resource usage information collected based on monitoring execution of a corresponding respective portion of the first source code, and wherein the resource usage information relates to at least one of: compute time, memory usage, or hit counts;

determining, based on resource usage information associated with a node of the one or more nodes, to generate metadata identifying the respective portion of the first source code associated with the node;

associating the metadata with the first source code;

detecting, by a source code migrator of a source code development environment, the metadata identifying the portion of the first source code, wherein the portion of the first source code represents functionality to be performed by a computing device upon execution of the portion of the first source code, wherein the metadata indicates a request to migrate execution of the portion of the first source code to a virtual compute service, and wherein the metadata includes a resource parameter related to computing resources to be obtained by the virtual compute service to execute the portion of the first source code; and sending, by the source code migrator, a request to the virtual compute service to create at least one virtual compute service function at the virtual compute service, wherein the request sent by the source code migrator includes second source code that implements the functionality represented by the portion of the first source code identified by the metadata and further includes the resource parameter, and wherein the virtual compute service automatically provisions, based on the resource parameter, computing resources used to execute the at least one virtual compute service function.

4. The computer-implemented method of claim 3, further comprising modifying the first source code to cause invocation of the at least one virtual compute service function during execution of the first source code.

5. The computer-implemented method of claim 3, further comprising:
performing a static analysis of the first source code to generate the call graph including the one or more nodes representing the respective portions of the first source code and the one or more edges representing calling relationships among the respective portions of the first source code; and
associating the metadata with the first source code identifying at least one of the respective portions of the first source code represented by a node of the call graph.

6. The computer-implemented method of claim 3, further comprising:
performing a dynamic analysis of execution of the first source code to generate resource usage information associated with the portion of the first source code;
determining that the resource usage information associated with the portion of the first source code exceeds resources made available by the virtual compute service to execute virtual compute functions; and
creating at least two virtual compute service functions at the virtual compute service based on the portion of the first source code.

7. The computer-implemented method of claim 3, further comprising:
detecting an update to the portion of the first source code identified by the metadata; and
updating the second source code associated with the at least one virtual compute service function at the virtual compute service to reflect the update to the portion of the first source code.

8. The computer-implemented method of claim 3, further comprising:
identifying dependent source code upon which the portion of the first source code depends; and
creating the second source code by packaging the portion of the first source code and dependent source code in a format accepted by the virtual compute service to obtain packaged code, wherein creating the at least one virtual compute service function includes sending the packaged code to the virtual compute service.

9. The computer-implemented method of claim 3, further comprising:
receiving, from the virtual compute service, one or more identifiers associated with the at least one virtual compute service function; and
wherein modifying the first source code to cause invocation of the at least one virtual compute service function includes inserting in the first source code an application programming interface (API) call using the one or more identifiers.

10. The computer-implemented method of claim 3, wherein the portion of the first source code comprises one or more of: a class, a method, and a subroutine.

11. The computer-implemented method of claim 3, wherein the resource parameter includes at least one of: an identifier of a runtime environment to be used by the computing resources used to execute the at least one virtual compute service function, an amount of memory to be used by the computing resources used to execute the at least one virtual compute service function, or a function timeout associated with execution of the virtual compute service function by the computing resources.

12. A non-transitory computer-readable storage medium storing instructions which, when executed by one or more processors of one or more computing devices, cause the one or more computing devices to:
generate a call graph based at least in part on a dynamic analysis of execution of first source code, the call graph including one or more nodes representing respective portions of the first source code and one or more edges representing calling relationships among the respective portions of the first source code, wherein at least one of the one or more nodes is associated with resource usage information collected based on monitoring execution of a corresponding respective portion of the first source code, and wherein the resource usage information relates to at least one of: compute time, memory usage, or hit counts;

determine, based on resource usage information associated with a node of the one or more nodes, to generate metadata identifying the respective portion of the first source code associated with the node;

associate the metadata with the first source code;

detect, by a source code migrator of a source code development environment, the metadata identifying the portion of the first source code, wherein the portion of the first source code represents functionality to be performed by a computing device upon execution of the portion of the first source code, wherein the metadata indicates a request to migrate execution of the portion of the first source code to a virtual compute service, and wherein the metadata includes a resource parameter related to computing resources to be obtained by the virtual compute service to execute the portion of the first source code; and send, by the source code migrator, at least one request to a serverless code execution environment to create two or more virtual compute service functions at the serverless code execution environment based on the portion of the first source code identified by the metadata, wherein the at least one request sent by the source code migrator includes second source code that implements the functionality represented by the one or more portions of the first source code and further includes the resource parameter, wherein a serverless code execution environment automatically provisions, based on the resource parameter, computing resources used to execute the two or more virtual compute service functions upon invocation of the two or more virtual compute service functions, and wherein execution of the two or more virtual compute service functions includes passing program control flow between the two or more virtual compute service functions.

13. The non-transitory computer-readable storage medium of claim 12, wherein the instructions further cause the one or more computing devices to modify the first source code to cause invocation of at least one of the two or more virtual compute service functions at the serverless code execution environment during execution of the first source code.

14. The non-transitory computer-readable storage medium of claim 12, wherein the instructions further cause the one or more computing devices to:
perform a static analysis of the first source code to generate the call graph including the one or more nodes representing the respective portions of the first source code and the one or more edges representing calling relationships among the respective portions of the first source code; and
associate the metadata with the first source code identifying at least one of the respective portions of the first source code represented by a node of the call graph.

15. The non-transitory computer-readable storage medium of claim 12, wherein the instructions further cause the one or more computing devices to:
detect an update to at least one of the one or more portions of the first source code identified by the metadata; and
update at least one of the two or more virtual compute service functions to reflect the update to the at least one of the one or more portions of the first source code.

16. The non-transitory computer-readable storage medium of claim 12, wherein the instructions further cause the one or more computing devices to:
identify dependent source code upon which the one or more portions of the first source code depend;
create the second source code by packaging the one or more portions of the first source code and dependent source code in a format accepted by the serverless code execution environment to obtain packaged code; and
wherein creating the two or more virtual compute service functions includes sending the packaged code to the serverless code execution environment.

\* \* \* \* \*